UNITED STATES PATENT OFFICE.

CHARLES S. LOCKWOOD, OF ALBANY, NEW YORK, ASSIGNOR TO THE BONSILATE COMPANY, (LIMITED,) OF SAME PLACE.

PLASTIC MATERIAL.

SPECIFICATION forming part of Letters Patent No. 283,793, dated August 28, 1883.

Application filed September 8, 1882. Renewed June 14, 1883. (No specimens.)

*To all whom it may concern:*

Be it known that I, CHARLES S. LOCKWOOD, of Albany, in the county of Albany and State of New York, have invented a new and useful Improvement in Plastic Materials, of which the following is a specification.

The invention has relation to the production of an improved plastic material, and is based upon the discovery that phosphate of ammonia, bone, ivory, horn, fish-scales, and other materials of a similar nature may be combined with shellac in the production of a composition heretofore unknown in the arts.

The invention which is the subject of this application is an improvement upon that described in Letters Patent No. 236,034, granted to John W. Hyatt, J. H. Stevens, and myself, jointly, December 28, 1880.

In practicing my invention I take, say, eight pounds of bone, ivory, horn, fish-scales, quills, or other materials of a similar nature, as thoroughly dehydrated as possible, which I reduce to the form of an impalpable powder. I recommend, especially, the use of comminuted bone, the employment of which produces the best result; but the other materials hereinbefore mentioned may be made use of, and the result will be a useful one, although not as satisfactory as that where the comminuted bone is employed. To the eight pounds of pulverized bone or other material I add, say, two ounces of phosphate of ammonia, (or the elements of phosphate of ammonia—to wit, phosphoric acid and ammonia, in such proportions that they produce the same effect as they would if combined to form a phosphate before being mixed with the bone.) I then introduce, say, two pounds of powdered shellac, as nearly desiccated as may be practicable, and mix the elements thoroughly together. The compound will then be ready to be introduced into the molds, and will be inserted in powdered form without further manipulation.

The molds will be of any desired configuration of the form usually employed in the manufacture of articles of plastic material. They will be heated to a temperature due to a pressure produced by, say, from sixty to eighty pounds of steam, the pressure being about one to two tons to the square inch.

I do not limit myself to the exact proportions I have specified, as they may be to some extent varied without impairing the result, and it is obvious that additions of inert material may be made to the ingredients without prejudice. Neither do I limit myself to the exact process I have described, as it may be departed from in unimportant particulars. Thus an appropriate solvent may be used in mixing the ingredients, or the compound may be worked by means of mixing-rollers, and other like expedients may be employed, if circumstances demand it.

The process of manipulation is not of the essence of the invention, and while I have described the method I prefer as the best and most satisfactory, other methods will be resorted to, if more convenient.

It is obvious that appropriate pigments may be added to give weight and color to the article desired to be produced, and that other known agents may be made use of for like purposes.

What I claim as my invention, and desire to secure by Letters Patent, is—

The plastic material or composition hereinbefore described, which consists, essentially, of bone or similar material, shellac, and phosphate of ammonia, (or its elements,) combined in substantially the proportions hereinbefore set forth.

In testimony that I claim the foregoing improvement in plastic materials, as above described, I have hereunto set my hand this 26th day of June, 1882.

CHARLES S. LOCKWOOD.

Witnesses:
ROBERT C. PRUYN,
CHAS. M. HYATT.